United States Patent [19]
Jacob

[11] Patent Number: 5,853,874
[45] Date of Patent: Dec. 29, 1998

[54] LOW VISCOSITY HOT MELT PRESSURE SENSITIVE ASHESIVE COMPOSITIONS

[75] Inventor: Lutz Erich Jacob, Tervuren, Belgium

[73] Assignee: Exxon Chemical Patents, Inc., Houston, Tex.

[21] Appl. No.: 898,018

[22] Filed: Jul. 22, 1997

Related U.S. Application Data

[63] Continuation of Ser. No. 748,521, Nov. 8, 1996, abandoned, which is a continuation of Ser. No. 345,103, Nov. 28, 1994, abandoned.

[51] Int. Cl.⁶ .................................. C08L 9/06; C09U 7/02
[52] U.S. Cl. .................... 428/343; 428/349; 428/355; 428/507; 428/509; 428/512; 524/483; 524/484; 524/505
[58] Field of Search ............................ 524/508, 483, 524/484; 428/343, 349, 355, 507, 509, 512

[56] References Cited

U.S. PATENT DOCUMENTS

| | | | |
|---|---|---|---|
| 4,078,132 | 3/1978 | Lopert | 526/76 |
| 4,104,327 | 8/1978 | Inoue, et al. | 260/876 B |
| 4,411,954 | 10/1983 | Butch, III et al. | 428/343 |
| 4,623,698 | 11/1986 | Jacob, et al. | 525/221 |
| 4,699,941 | 10/1987 | Salerno | 524/308 |
| 5,143,968 | 9/1992 | Diehl et al. | 524/534 |
| 5,183,705 | 2/1993 | Birkholz, et al. | 428/343 |
| 5,342,858 | 8/1994 | Litchholt et al. | 521/98 |
| 5,428,109 | 6/1995 | Kuroiwa et al. | 525/210 |
| 5,439,963 | 8/1995 | Korpman | 524/271 |

FOREIGN PATENT DOCUMENTS

| | | | |
|---|---|---|---|
| A2-0 318 217 | 5/1989 | European Pat. Off. | C09J 3/14 |
| WO-A-93/17079 | 9/1993 | WIPO . | |

OTHER PUBLICATIONS

Encyclopedia of Chemical Technology, (Fourth Edition), 1995, vol. 13, pp. 727–728.

*Primary Examiner*—Ana Woodward
*Attorney, Agent, or Firm*—William G. Muller; Frank E. Reid; John E. Schneider

[57] ABSTRACT

A low melt viscosity hot melt pressure sensitive adhesive composition having enhanced tack properties is provided. The composition is based on an S-I-S block copolymer having polystyrene and polyisoprene block segments blended with a petroleum tackier resin which is the Friedel Crafts polymerization product of (i) a cracked petroleum feed containing $C_5$ olefins and diolefins or a mixture of $C_5$ and $C_6$ olefins and dioelefins copolymerized with (ii) from about 5 to 15% by weight of a monovinyl aromatic monomer having 8 or 9 carbon atoms, e.g., styrene. The composition optionally also includes a polystyrene—polyisoprene diblock copolymer and a processing oil. The composition may be readily applied as solvent-free melt to various substrates using coating die technology because of its low melt viscosity at coating temperatures.

15 Claims, No Drawings

LOW VISCOSITY HOT MELT PRESSURE SENSITIVE ASHESIVE COMPOSITIONS

This is a continuation of application Ser. No. 08/748,521, filed Nov. 08, 1996, which is a continuation of Ser. No. 08/345,103, filed Nov. 28, 1994 both now abandoned.

BACKGROUND OF THE INVETION

1. Field of the Invention

This invention relates to low viscosity, hot melt, pressure sensitive adhesive compositions which can be applied to substrates as a melt using high speed coating equipment.

2. Description of Related Art

Hot melt pressure sensitive adhesive compositions based on thermoplastic block copolymers derived from a monovinyl aromatic hydrocarbon and a conjugated diolefin mixed with a tackifying resin are well known in the art. Typically such compositions contain a block copolymer of the A-B-A type as a base polymer, wherein A is typically a polymerized styrene block and B is typically a polymerized block of isoprene or butadiene, said copolymer generally having a number average molecular weight in the range of from about 25,000 to about 500,000. Mixtures of these block polymers with appropriate amounts of a tackifier resin, such as a terpene or rosin-type resin, and a processing oil provide compositions which combine good adhesive and cohesive properties, thereby rendering them particularly useful as hot melt pressure sensitive adhesives.

Examples of such prior art hot melt pressure sensitive adhesives (HMPSA) are found in a number of prior art patents. For example, U.S. Pat. Nos. 4,411,954 and 4,699,941 disclose HMPSA based on a mixture of an A-B-A styrene-isoprene-styrene block copolymer blended with a tackifying resin and an antioxidant. A preferred disclosed tackifying resin is one derived from a polymerized mixture of aliphatic dienes and $C_5$ or $C_6$ monoolefins. U.S. Pat. No. 4,104,327 discloses pressure sensitive adhesive compositions based on styrene-butadiene or styrene-butadiene-styrene block copolymers, mixed with an optional styrene-isoprene or styrene-isoprene-styrene block copolymer and further containing, as a tackifier, a hydrocarbon resin containing from 49–95% by weight of 1,3-pentadiene units and from 60 to 5% by weight of alpha-methylstyrene units in the polymer chain and having a softening point of 60° C. to 140° C.

In addition, pressure sensitive adhesive compositions are also disclosed in the art which contain petroleum resins based on copolymers of a feed comprising predominantly $C_5$ and $C_6$ monolefins and diolefins and up to about 30 wt % of a monovinyl aromatic compound as a tackifying resin. For Example, U.S. Pat. No. 4,623,698 discloses aqueous-based pressure sensitive adhesive compositions based on a mixture of a carboxylated styrene/butadiene copolymer and such a petroleum tackifying resin. U.S. Pat. No. 4,078,132 discloses similar petroleum resins used to tackify various elastomeric polymers and copolymers.

While these and other HMPSA compositions are suitable as adhesives in various applications, these compositions are not ideally suited for use in conjunction with high speed (>500 meters/min) HMPSA coating machines. The HMPSA must pass thin channels in the coating die associated with such machines. Since allowable pressure in these dies is limited, the viscosity of the HMPSA composition at coating temperatures (150° C. up to about 180° C.) becomes a key issue. If the melt viscosity of the composition is too high, equipment normally used to apply a melt to a substrate can not be effectively used. Viscosity of the HMPSA can be reduced by the inclusion of high loadings of processing oils or solvents into the composition, but inclusion of high loadings of processing oil tends to diminish the desirable adhesive and cohesive properties of the HMPSA and inclusion of solvents tends to add to the expense of the coating operation, increased fire hazards and requires solvent recovery equipment for environmental purposes.

SUMMARY OF THE INVENTION

The invention provides for a low melt viscosity, solvent free, hot melt pressure sensitive adhesive composition which exhibits both excellent cohesive and adhesive strength, said composition comprising a mixture of:

a) 100 parts by weight of a thermoplastic elastomer having the structure $(S\text{-}I)_{n-1}S$ wherein S is substantially a polystyrene block, I is substantially a polyisoprene block and n is an integer of from 2 to 10 and wherein the content of polystyrene in said thermoplastic elastomer ranges from about 10 to about 30% by weight and wherein the number average molecular weight of said thermoplastic elastomer ranges from about 50,000 to about 500,000;

b) from about 70 to about 150 parts by weight of a petroleum resin tackifier having a softening point in the range of from about 85° C. to about 105° C., said resin being a Friedel Crafts copolymer comprising:
  i) a petroleum feed comprising $C_5$ olefins and $C_5$ diolefins or a mixture of $C_5$ and $C_6$ olefins and diolefins, said feed being obtained from the cracking of petroleum feedstock, copolymerized with
  ii) from about 5 to 15% by weight, based on component (i), of one or a mixture of monovinyl aromatic compounds having 8–9 carbon atoms;

said composition characterized as having a melt viscosity at 175° C. of less than about 100,000 mPa.s as measured by ASTM-D3236.

The composition of the present invention is suitable for application to a suitable substrate for the production of adhesive tapes which are particularly useful for effective sealing of packaging materials, especially corrugated cardboard containers.

DETAILED DESCRIPTION OF THE INVENTION

The block copolymer used as the base elastomer component of the adhesive composition of the invention is preferably a triblock copolymer of the above formula wherein n=2, i.e., is a linear polymer of the formula S-I-S wherein S is substantially a polystyrene block and I is substantially a polyisoprene block. These block copolymers may be prepared by well known anionic solution polymerization techniques using lithium-type initiators such as disclosed in U.S. Pat. Nos. 3,251,905 and 3,239,478, the complete disclosure of which patents is incorporated herein by reference.

Preferred block copolymers have a number average molecular weight (determined by GPC) in the range of from about 50,000 to 500,000, more preferably from about 90,000 to about 250,000, even more preferably 90,000 to 175,000, and most preferably 90,000 to 135,000. These block copolymers contain from about 10 to 30% by weight of polymerized styrene, more preferably from about 15 to 25% by weight polymerized styrene and most preferably from about 16–20% by weight polymerized styrene.

The block copolymer component may also comprise a blend of two different block thermoplastic elastomers, one having a polystyrene block content of 10–20% by weight and the other having a different polystyrene block content of from 15–35% by weight, blended in a ratio in the range of from about 10:1 to 1:10 parts by weight. The use of two different block copolymers offers the advantages of improved cohesive strength and more precisely tailoring polystyrene content in the preferred target range of from about 15 to 25%, or 16–20% by weight respectively.

Though a pure triblock copolymer is preferred (one having less than 0.1 wt. of diblock polymer) the composition may also contain from about 0.1 to about 10 wt. %, preferably less than or equal to 6 wt. %, most preferably less than 5 wt. % of triblock copolymer of a di-block copolymer having the structure S-I and containing from about 10 to 30% by weight of the polystyrene block. This material may be present as an impurity in the manufacture of the triblock copolymer or may be separately blended with the triblock as a further technique for achieving target polystyrene content or modifying the cohesive properties of the composition. Preferred number average molecular weight of the di-block copolymer ranges from about 40,000 to about 250,000.

These linear and radial block copolymers are available commercially and are prepared in accordance with methods known in the art. See the disclosures of U.S. Pat. Nos. 5,143,968, 5,292,819 and 5,358,783, each of which is incorporated by reference for purposes of U.S. patent practice.

Particularly preferred block copolymers used in this invention have a melt flow rate in the range of from about 5 to 20 g/10 min, more preferably from about 10 to 18 g/10 min., as measured by ASTM D 1238 -82 using condition G (200° C., 5 kg. weight).

The petroleum resins used as tackifier according to the present invention are prepared by the polymerization of a mixture of a petroleum cracked distillate generally boiling in the range 25° C. to 80° C. and a monovinyl aromatic monomer having 8 or 9 carbon atoms in the proportions to yield a resin containing from 5–15 wt. % of the monovinyl aromatic compound as determined by Nuclear Magnetic Resonance analysis. The petroleum cracked distillate comprises a mixture of saturated and unsaturated monomers, the unsaturated monomers being mono-olefines and diolefines and, although the unsaturated materials are predominantly $C_5$, some higher and lower materials such as $C_6$ olefines and diolefines may be present. The distillate may also contain saturated or aromatic materials which can act as a polymerization solvent.

The preferred monovinyl aromatic monomer is styrene which may be substituted in the aromatic group. Alternatively alpha-methyl styrene or vinyl toluene may be used. It is however, preferred for color reasons to use the pure monomer rather than the commercially available mixtures of vinyl aromatic monomers.

The resins are conveniently prepared by Friedel-Crafts catalyzed polymerization in which the mixture of cracked distillate and monovinyl aromatic monomer are treated with 0.25–2.5 wt. % of a catalyst such as aluminum chloride, aluminum bromide, or solutions, slurries or complexes thereof or borontrifluoride. The polymerization mixture may also include from about 10 to 100 wt % of a chain transfer agent such as a diisobutene oligomer to obtain resins having a narrower molecular weight distribution. These reactions are generally carried out at temperatures in the range 0° to 120° C., preferably 0° to 80° C., more preferably 20° to 55° C., the conditions being controlled to yield a resin of the required softening point. Residual catalyst is quenched by suitable methods such as addition of methyl alcohol and subsequent filtration followed by water and/or caustic washing. The final solution may then be stripped of unreacted hydrocarbons and low molecular weight oils by vacuum or steam distillation.

The most preferred tackifier resins have ring and ball softening points in the range of from about 85° C. to about 105° C., more preferably in the range of from about 90° C. to about 100° C. and a content of monovinyl aromatic monomer, e.g., styrene, in the range of about 6–12 wt %.

A particularly preferred tackifier for use in the present invention has the following typical properties:

| | |
|---|---|
| Softening Point (°C.) | 92 |
| Gardner Color | 3 |
| Styrene content (NMR) % | 7–10 |
| Mn (number average MW) | 1150 |
| Mw (weight average MW) | 1840 |
| Mw/Mn (molecular weight distribution) | 1.6 |
| Mz (viscosity average MW) | 2800 |

These resins and their method of manufacture are more generally disclosed in U.S. Pat. 4,078,132, the complete disclosure of which is incorporated hereby by reference for the purpose of U.S. patent practice.

The quantity of resin tackifier used in combination with the block copolymer may range from about 70 to about 150 parts by weight per 100 parts by weight of the block copolymer. A more preferred level of addition is in the range of from about 90 to about 125 parts by weight per 100 parts by weight of block copolymer.

The adhesive composition may also include other additives as known in the art such as hydrocarbon extender oils, antioxidants, colorants, fillers and the like.

Suitable extender oils include aromatic, naphthenic or paraffinic oils and mixtures thereof One of the particular advantages of the invention is that none or only minor amounts of extender oil may be required to achieve good flow and coating characteristics because of the inherently low melt viscosity properties of the adhesive of the invention. Reduction in the level of extender oil required to process the composition tends to result in improved cohesiveness of the adhesive and reduces bleed out of the extender. Where used, the extender oil is added at a level from about 0.5 to about 25 parts by weight per hundred parts by weight of the block copolymer, more preferably from about 5 to 15 parts by weight.

Suitable antioxidants include hindered phenols such as 2,6-di-t-butyl-4-methylphenol; 1,3,5-trimethyl-2,4,6-tris (3', 5'-di-t-butyl-4'-hydroxybenzyl)-benzene; tetrakis [(methylene (3,5-di-t-butyl-4-hydroxyhydrocinnamate)] methane (IRGANOX™ 1010); octadecyl-3,5-di-t-butyl-4-hydroxy cinnamate (IRGANOX™ 1076); and like known materials. Where present, the antioxidant is used at a preferred level of from about 0.05 to about 2 parts by weight per 100 parts by weight of block copolymer.

As indicated above, the components forming the adhesive formulation of the invention have properties such that adhesives having a very low melt viscosity are provided, thereby facilitating flow of the adhesive through the coating apparatus, e.g., coating die, without resorting to the inclusion of solvents or excess extender oil into the composition. Melt viscosities of from about 35,000 to less than about 100,000 milli Pascal second (mPa.s or CPS) measured at 175° C. per ASTM D 3236 can be readily achieved. The more preferred melt viscosity at 175° C. is less than 80,000 m.Pas and the most preferred melt viscosity at 175° C. lies in the range of from about 35,000 to about 50,000 mPa.s.

Highly efficient manufacturing processes are made possible through use of the adhesive formulations of the invention since high speed coating means can be used. For example, the manufacture tapes of oriented polypropylene film requires coating application speeds of at least 250 m/min. The formulations of the invention are capable of application up to 750 m/min. or more, and the high speed efficiency processes of this invention can utilize preferred coating speeds of 500 m/min. and up.

The components of the adhesive composition may be blended by mixing them using any suitable mixing device at a temperature above the melting point of the components, e.g., at 130° to 180° C. for a period of time sufficient to form a homogeneous mixture, normally 1 to 120 minutes depending on the type of mixing device.

The adhesive composition of the present invention may be applied to a substrate as a melt and then cooled using conventional procedures. The substrate used depends upon the use envisaged but it is usually a relatively thin material, usually no greater than about 3.2 mm in thickness, and in the manufacture of tapes and labels the substrate is a relatively thin sheet material. The sheet material may be a polymeric material which is flexible at room temperature. The sheet material may be a homopolymer of an ethylenically unsaturated monomer such as ethylene, propylene or vinyl chloride, or be polyester or polyamide provided it has sufficient flexibility for the desired end use. Alternatively the substrate may be made from cellulosic or reconstituted cellulosic material such as rayon. The substrate need not be a sheet material but may be composed of fibers which may be woven, or non woven as is the case in paper. Woven substrates may be made from cellulosic material, such as cotton or from fibers of any of the above mentioned polymers.

The composition is applied to the substrate using conventional coating techniques such as roller coaters, die coaters and blade coaters, generally at a temperature in the range of from about 150° C. to 200° C. For example, the ready mixed HMPSA heated to the temperature where it will flow readily, usually at temperatures from 170° C. to 190° C., can be applied to a flexible backing by any of know techniques, preferably using a slot die.

A slot die is a closed system where the HMPSA is pumped through by a positive displacement pump. The slot die usually includes a rotating bar at the point of the outlet of the HMPSA in order to obtain a smooth coating surface.

Due to required thin channels inside the die through which the HMPSA has to flow, it is obvious that there are melt viscosity limits for the HMPSA depending on required throughput. Thus one can say that, the higher the coating speed is, the lower the melt viscosity needs to be to obtain consistent and even coating at the desired thickness onto the web.

The substrate should be coated with sufficient composition to provide a dry coat weight from about 10 to about 65 g/cm$^2$. Generally in the manufacture of tapes using a continuous sheet polymeric substrate, a dry coat weight of about 10–30 g/m$^2$ is used. In the manufacture of labels, a dry coat weight from about 10 to 30 g/cm$^2$ is usually used. In the manufacture of masking tape a dry coat weight from about 35 to about 65 g/cm$^2$ is usually used.

After coating, the coated substrate is cut to the required dimension. In the manufacture of tape the substrate is cut into strips and rolled to provide a finished product. The substrate may also be cut into shaped items to provide labels or medicinal tapes.

The following examples are illustrative of the invention. Materials used in preparing the adhesive compositions as identified in the examples are as follows:

| | |
|---|---|
| V4111 SIS- | A linear polystyrene-polyisoprene-polystyrene triblock copolymer supplied by Dexco Polymers having a styrene content of 17.5–19.0% by weight, melt flow rate of 9.7–13.8 g, 10 min., a number average mol. wt. of 125,000 ± 2%, and 0 wt. % diblock (SI).[1] |
| DPX 511 SIS- | A linear polystyrene-polyisoprene-polystyrene triblock copolymer supplied by Dexco Polymers having a styrene content of 17.5 to 19.0% by weight, melt flow rate of 14.5–17 g, 10 min., number average mol. wt. of 110,000 ± 2%, and 0 wt. % diblock (SI).[1] |
| CARIFLEX ® TR 1107- | A polystyrene-polyisoprene-polystyrene triblock copolymer of Shell Chemical being a styrene content of 15 wt. %, diblock (SI) content of 18 wt. %, 0 melt flow rate 9 g/10 min., and number average mol. wt. of 160,000.[1] |
| QUINTACK ® 3450- | A radial polystyrene-polyisoprene-polystyrene from Nippon Zeon having 20 wt. % styrene, 30 wt. % di-block content, melt flow rate of 15 g, 10 min., and number average mol. wt. of 180,000.[1] |
| E–1310- | Petroleum resin available under the trade name ESCOREZ ™ from Exxon Chemical Company and containing about 0.3% by weight of polymerized styrene and having a softening point of about 93.5° C. |
| E–2203- | Petroleum resin available under the trade name ESCOREZ ™ from Exxon Chemical Company and containing about 8–10% by weight of polymerized styrene, and having a softening point of about 92° C. and a number average molecular weight of about 1150. |
| WINGTACK ® EXTRA- | Petroleum resin available from Good Year containing about 6.9% by weight of polymerized styrene and having a softening point of about 99.2° C. |
| FLEXON ® 876- | A paraffinic extender oil available from Exxon Chemical Company. |
| SI-Diblock- | A polystyrene-polyisoprene di-block copolymer containing about 18% by weight-polymerized-styrene. |
| ANTIOXIDANT- | IRGANOX ® 1076, a phenolic compound of CIBA GEIGY |

[1]Note: styrene contents, molecular weights and melt flow rates were measured in accordance with the methods described in U.S. pat. no. 5,143,968.

The various test methods identified in the Tables are as follows:

Ball Tack is measured by Pressure Sensitive Tape Council (PSTC) test 6.

180° Peel Strength is measured by PSTC-1 test.

Loop Tack is measured by the FINAT-9 test.

Viscosity is measured by ASTM D-3236 test.

Hot shear is measured by suspending a 1000 gram weight from a 25 mm wide strip of MYLAR™ polyester film coated with the adhesive formulation which is adhered to a stainless steel plate or corrugated cardboard surface with a contact area of 12.5 mm. x 25 mm. The sample is placed in a ventilated oven at 40° C. Time is recorded until stress failure occurs. Typically, these tests are made and recorded individually to determine reliability of the holding power.

Shear Adhesion Failure Temperature (SAFT) is determined by adhering a coated MYLAR strip of 25 mm. width to stainless steel with a contact area of 12.5 mm.x25 mm., hanging the samples in an oven held at 25° C. and suspending a 500 gram weight from the bottom of the strip. The temperature is raised at 0.4 C°/min and the bond failure temperature is measured. The Shear Adhesion Temperature is the average of three tests.

EXAMPLES 1–11

A series of adhesive compositions both within and outside the scope of the invention were prepared by mixing ingredients as set forth in Table 1 in a two blade mixer at 145° C. for a period of 70 minutes. The composition was then heated to about 190° C. and the melt was pumped through a coating die onto a 36 micron MYLAR™ polyester film. The dry weight of the applied coating layer ranged from about 19 to 24 g/m². After coating, the tacky side of the film was laminated to a release paper and the film was wound and cut.

Formulation and physical property data for the various formulations are shown in Table 1.

As is evident from the physical property data of Table 1, compositions within the scope of the invention show generally enhanced ball tack and 40° C. shear properties as compared with compositions containing a low styrene content tackifier resin. In addition, lower melt viscosities are achieved as evidenced by both Brookfield and Haake viscosity data. Haake data allows a more elaborate evaluation of the viscosity of materials because absolute viscosity is recorded as a dynamic function based on shear rate, as a function of time and as a function of temperature.

EXAMPLES 12–15

Four additional adhesive compositions were prepared in accordance with the method of Examples 1–11 and adhesive and viscosity data was obtained. These formulations and data are shown in Table 2, which also includes comparative data from Examples 1 and 2.

These examples 12–15 illustrate that inclusion of 6 parts by weight of a polystyrene-polyisoprene diblock copolymer has very little effect on the good tack, shear and viscosity properties of the composition. A comparison with examples 1 and 2 once again illustrates that low styrene or styrene-free tackifier resins provide an adhesive with inferior tack and shear properties, as well as higher melt viscosity.

EXAMPLES 16–19

The four examples of Table 3 illustrate a direct comparison of two linear SIS polymers in identical compositions prepared as for Examples 1–11 above. The DPX 511 SIS polymer being pure triblock (no significant diblock) exhibits both higher shear on cardboard at 40° C. and lower melt viscosity.

EXAMPLES 20–22

These examples of Table 4 compare a commercially available radial triblock copolymer with two linear triblock copolymers. Each example was formulated at 100 parts block polymer, 120 parts Escorez™ 2203, 10 parts Flexon® 876, and 1 part antioxidant. The blend formulations were mixed for 70 min. at 145° C. and coated on mylar at a thickness of 23 microns, coating weight of 18–20 g/m². Each sample was covered with release coated oriented polypropylene film before being applied. Improved shear on cardboard at 40° C., SAFT and loop tack was observed with the linear block copolymers while decreased viscosity was observed for the radial block copolymer.

TABLE 1

| FORMULATION | EX. 1* | EX. 2 | EX. 3 | EX. 4* | EX. 5 | EX. 6 | EX. 7* | EX. 8* | EX. 9* | EX. 10 | EX. 11 |
| --- | --- | --- | --- | --- | --- | --- | --- | --- | --- | --- | --- |
| V-4111 SIS | 100 | 100 | 100 | — | — | — | 100 | — | 100 | 100 | — |
| DPX-511 SIS | — | — | — | 100 | 100 | 100 | — | 100 | — | — | 100 |
| E 1310 | 120 | — | — | 120 | — | — | 100 | 100 | 60 | — | — |
| E 2203 | — | 120 | — | — | 120 | — | — | — | 40 | 100 | 100 |
| WINGTACK EXTRA | — | — | 120 | — | — | 120 | — | — | — | — | — |
| FLEXON 876 | 10 | 10 | 10 | 10 | 10 | 10 | — | — | — | — | — |
| ANTIOXIDANT | 1 | 1 | 1 | 1 | 1 | 1 | 1 | 1 | 1 | 1 | 1 |
| 180 PEEL STRENGTH (N/CM)-steel | 7.73 | 7.73 | 8.07 | 7.60 | 7.80 | 8.20 | NT | NT | NT | NT | NT |
| LOOP TACK (H/25 mm)-steel | 25.4 | 30.3 | 27.5 | 26.1 | 29.8 | 29.3 | NT | NT | NT | NT | NT |
| BALL TACK (cm) | 1.5–2.0 | 3.5 | 5.0 | 2.0 | 1.5 | 6.0—>15 | NT | NT | NT | NT | NT |
| SHEAR AT RT (hours)-cardb. 25 mm* 12.5 mm 1 kg | >150 >150 | >150 >150 | >150 >150 | >150 >150 | >150 >150 | >150 >150 | NT | NT | NT | NT | NT |
| SHEAR AT 40° C. (hours)-cardb. 25 mm* 12.5 mm 1 kg | 12 h 20' | 42 h | 22 h 40' | 9 h 30' | 45 h 30' | 17 h 30" | NT | NT | NT | NT | NT |
| SAFT (deg C.)-steel 25 mm* 12.5 mm 0.5 kg | 94 | 99 cf | 96 cf | 100 | 96 cf | 96 cf | NT | NT | NT | NT | NT |
| Brookfield viscosity at 175° C. (mPa · s) | | | | | | | | | | | |
| -sp 27–0.5 rpm | 189000 | — | — | 153000 | — | — | NT | | NT | NT | NT |
| -sp 27–1.0 rpm | — | 83000 | 89000 | — | 69000 | 70000 | | | | | |
| Haake viscosity as function of temp. -ETA-T (170–200° C. at 24 l/s) | | | | | | | | | | | |
| at 170° C. (mPa · s) | 221000 | 60000 | 77000 | 161000 | 56000 | 76000 | 330000 | 207000 | 249000 | 166000 | 151000 |
| at 175° C. (mPa · s) | 157000 | 47000 | 60000 | 118000 | 39000 | 58000 | NT | NT | NT | NT | NT |
| at 180° C. (mPa · s) | 112000 | 37000 | 46000 | 83000 | 30000 | 45000 | 167000 | 105000 | 119000 | 89000 | 83000 |
| at 190° C. (mPa · s) | 50000 | 22000 | 28000 | 37000 | 20000 | 27000 | 86000 | 53000 | 61000 | 49000 | 47000 |
| at 200° C. (mPa · s) | 29000 | 16000 | 18000 | 22000 | 16000 | 17000 | 44000 | 27000 | 30000 | 28000 | 27000 |

*Outside scope of the invention. NT-Not Tested. Haake for Ex. 7–11 is ETA-T (170–200° C. at 1.5 l/s) af-adhesive failure. cf-cohesive failure.

TABLE 2

| FORMULATION | EX. 12 | EX. 13 | EX. 14 | EX. 15 | EX. 2 | EX. 1*** |
|---|---|---|---|---|---|---|
| V-4111 SIS | 100 | — | 94 | — | 100 | 100 |
| DPX-511 SIS | — | 100 | — | 94 | — | — |
| SI-Di Block | — | — | 6 | 6 | — | — |
| E-1310 | — | — | — | — | — | 120 |
| E-2203 | 120 | 120 | 120 | 120 | 120 | — |
| PROCESS OIL | — | — | — | — | 10 | 10 |
| ANTIOXIDANT | 1 | 1 | 1 | 1 | 1 | 1 |
| 180 PEEL STRENGTH (N/CM)-steel | 7.7 | 7.7 | 7.6 | 7.9 | 7.73 | 7.73 |
| LOOP TACK (N/25 mm)-steel | 28.3 | 28.1 | 28.5 | 28.8 | 30.3 | 25.4 |
| BALL TACK (cm) | 1.5 | 1.5 | 1.5 | 1.5 | 3.5 | 1.5–2.0 |
| SHEAR AT RT (hours)-cardb. 25 mm* 12.5 mm 1 kg | >120 | >120 | >120 | >120 | >150 | >150 |
|  | >120 | >120 | >120 | >120 | >150 | >150 |
| SHEAR AT 40° C. (hours)-cardb. 25 mm* 12.5 mm 1 kg | 13 h 17' | 22 h 27' | >50 | 12 h 06' | >24 h 59'af | >0 h 49' |
|  | >50 | 27 h 08' | >50 | 42 h 56' | >50 | >7 h 15' |
|  | >50 | >50 | >50 | 43 h 00' | >50 | >15 h 01' |
|  | >50 | >50 | >50 | >50 |  | >32 h 22' |
| SAFT (deg C.)-steel 25 mm* 12.5 mm 0.5 kg | 96 | 95 | 95 | 94 | 99 cf | 94 |
| Brookfield viscosity at 175° C. (mPa · s)-sp 27–0.5 rpm | 69000 | 49000 | 54000 | 45000 | 83000 | 189,000 |

**Outside scope of Invention

TABLE 3

| FORMULATION | EX. 16 BLEND 1 | EX. 17 BLEND 2 | EX. 18 BLEND 3 | EX. 19 BLEND 4 |
|---|---|---|---|---|
| DPX-511 SIS | 100 | 100 | 100 | 100 |
| E 2203 | 100 | 120 | 100 | 120 |
| FLEXON 878 | 5 | 5 | 15 | 15 |
| ANTIOXIDANT | 1 | 1 | 1 | 1 |
| 180 peel adhesion (N/cm (steel) | 6.47 | 7.67 | 6.00 | 6.67 |
| Loop Tack (N/25 mm) (steel) | 24.2 | 28.8 | 21.8 | 24.1 |
| Ball tack (cm) | 1.5 | 1.5 | 1.5 | 1.5 |
| Shear on cardboard at 40° C. 25 mm* 12.5 mm - 1 kg (hrs) | >50 | 45 h 30' | 39 | 31 h |
| Saft (°C.) Average | 100.5 | 97.4 | 98.1 | 93.1 |
| Blend viscosity at 175° C. (cps) (spindle/rpm-after 2 hrs) | 78800 | 59600 | 61000 | 39000 |
| CARIFLEX TR 1107 | 100 | 100 | 100 | 100 |
| E 2203 | 100 | 120 | 100 | 120 |
| FLEXON 876 | 5 | 5 | 15 | 15 |
| ANTIOXIDANT | 1 | 1 | 1 | 1 |
| 180 peel adhesion (N/cm (steel) | 6.08 | 7.45 | 5.47 | 6.40 |
| Loop Tack (N/25 mm) (steel) | 20.2 | 22.7 | 20.8 | 22.1 |
| Shear on cardboard at 40° C. 25 mm* 12.5 mm-1 kg (hrs) | 43 h 40' | 24 h 20' | 5 h 50' | 5 h 10' |
| Saft (°C.) Average | 95 | 90.8 | 90.6 | 89.8 |
| Blend viscosity at 175° C. (cps) (Brookfield) (spindle/rpm-after 2 hrs) | 163000 | 108000 | 105,000 | 73200 |
|  | (27/1.0) | (27/1.0) | (27/1.0) | (27/2.5) |

TABLE 4

| FORMULATION | EX. 20 Quintac ® 3450 | EX. 21 V 4111 reference | EX. 22 DPX 511 reference |
|---|---|---|---|
| 180° peel strength (N/cm) -steel | 6.7 | 8.1 | 7.6 |
| loop tack (N/25 mm) -steel | 26.2 | 32.2 | 30.0 |
| ball tack (cm) | 1.5 | 1.5 | 2.0 |
| shear at RT (hours -cardb. 25 mm * 12.5 mm 1 kg | >120 >220 | >120 >120 | >120 >120 |
| SAFT (°C.) -steel 25 mm * 12.5 mm 0.5 kg | 93 cf | 101 cf | 99 cf |
| Coating temperature (°C.) | 185 | 200 | 185 |

TABLE 4-continued

| FORMULATION | EX. 20 Quintac ® 3450 | EX. 21 V 4111 reference | EX. 22 DPX 511 reference |
|---|---|---|---|
| Brookfield viscosity at 175° C. (mPa · s) | 44000 (sp 2.7–2.5 rpm) | 87000 (sp 2.7–1 rpm) | 62000 (sp 2.7–1 rpm) |
| sheer at 40° C. (hrs) -cardb. 25 mm * 12.5 mm 1 kg | 34h00'a f | 36h03'a f | >50 |

I claim:

1. A hot melt pressure sensitive adhesive composition comprising a mixture of:
   a) 100 parts by weight of a thermoplastic elastomer having the structure $(S-I)_{n-1}$ S, wherein S is a polystyrene block, I is a polyisoprene block and n is an integer of from 2 to 10 and wherein the content of polystyrene in said thermoplastic elastomer ranges from about 10 to 20% by weight and wherein the number average molecular weight of said thermoplastic elastomer ranges from about 50,000 to about 175,000, said thermoplastic elastomer containing less than 0.1 weight percent diblock S-I;
   b) from about 70 to about 150 parts by weight of a petroleum resin tackifier having a softening point in the range of from about 8.5° C. to about 105° C., said resin being a Friedel Crafts copolymer comprising:
      i) a petroleum feed comprising $C_5$ olefins and diolefins or a mixture of $C_5$ and $C_6$ olefins and diolefins, said feed being obtained from the cracking of petroleum feedstock, copolymerized with
      ii) from about 5 to 15% by weight, based on component (b) of one or a mixture of monovinyl aromatic compounds having 8–9 carbon atoms;
   said composition characterized as having a melt viscosity at 175° C. of from about 35,000 to less than about 100,000 mPa.s as measured by ASTM-D3236.

2. The composition of claim 1 wherein n is 2.

3. The composition of claim 2 further containing from about 0.5 to about 25 parts by weight of an aromatic, naphthenic or paraffinic extender oil.

4. The composition of claim 2 wherein said monovinylaromatic compound is styrene.

5. The composition of claim 2 wherein said thermoplastic elastomer comprises a blend of at least two different block copolymers, one having a polystyrene block content of from about 10 to about 20% by weight and another having a different polystyrene block content of from about 15 to about 35% by weight.

6. The composition of claim 2 further containing from about 0.05 to about 2 parts by weight of an antioxidant.

7. The composition of claim 2 further containing from about 0.1 up to about 10 parts by weight of a di-block copolymer having the structure S-I, said di-block copolymer having a polystyrene content of from about 10 to about 30% by weight.

8. The composition of claim 2 wherein said thermoplastic elastomer has a number average molecular weight in the range of from about 90,000 to about 175,000.

9. The composition of claim 2 wherein said petroleum resin tackifier is present at a level of from about 90 to about 125 parts by weight.

10. The composition of claim 2 wherein said petroleum resin has a softening point in the range of from 90° C. to 100° C. and a content of monovinyl aromatic monomer is the range of about 6 to 12% by weight.

11. The composition of claim 2 wherein the melt viscosity of said composition is in the range of from about 35,000 to about 80,000 mPa.s.

12. The hot melt pressure sensitive adhesive composition of claim 1 wherein the content of polystyrene in said styrenic block copolymer ranges from about 10 to 20% by weight.

13. An adhesive tape comprising a tape substrate having the adhesive composition of claim I applied to one surface thereof at a dry thickness in the range of from about 10 to 65 g/cm$^2$.

14. The tape of claim 13 wherein the adhesive surface of said tape is in contact with corrugated cardboard.

15. A process for preparing an adhesive tape comprising:
   a) heating the hot melt pressure sensitive adhesive composition of claim 1 to a temperature in the range of from about 150° C. to about 200° C.;
   b) applying a thin coating of said melt to the surface of a tape substrate at a speed greater than or equal to 500 m/min. to form a coated substrate; and
   c) cooling said coated substrate.

* * * * *